March 6, 1951 A. RITTER 2,544,238
FISHING LINE GUIDE
Filed May 7, 1949

INVENTOR.
ANDREW RITTER.
BY Archwork Martin
his ATTORNEY.

Patented Mar. 6, 1951

2,544,238

UNITED STATES PATENT OFFICE 2,544,238

FISHING LINE GUIDE

Andrew Ritter, Pittsburgh, Pa.

Application May 7, 1949, Serial No. 91,942

1 Claim. (Cl. 43—24)

My invention relates to rod tips and guides for fishing lines, and more particularly to tips and guides for fishing rods used in casting.

One object of my invention is to provide fishing rod tips and guides of such form that they will allow free movement or "shedding" of the fishing line and will avoid tangling and knotting of the fishing line on the rod tip.

Another object of my invention is to provide a line guide of such form that it will be effective for guiding the line with minimum danger of tangling or knotting of the line on the tip, and which nevertheless is not subject to breaking, even though accidentally stepped on.

Still another object of my invention is to provide a guide that while it is effective to guide the line in an improved manner, it will be of lighter weight than are guides as heretofore constructed.

Figure 1:
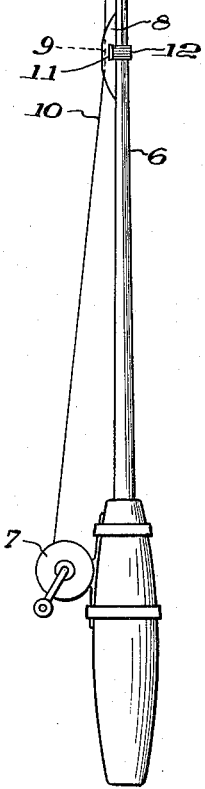
Figure 2:
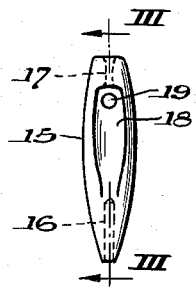
Figure 3:
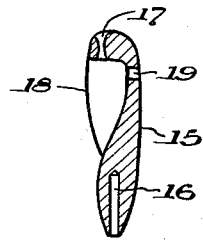
Figure 4:
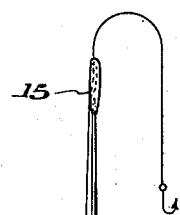
Figure 5:
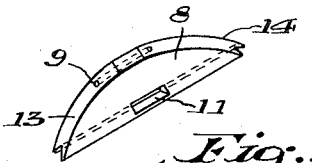

Some of the forms which my invention may take are shown in the accompanying drawing wherein Figure 1 is a side view of a fishing rod having my invention applied thereto; Fig. 2 is a plan view on an enlarged scale of the guide of Fig. 1; Fig. 3 is a view taken on the line III—III of Fig. 2; Fig. 4 is a sectional view showing a modification of the structures of Figs. 2 and 3, and Fig. 5 is a perspective view showing the guide that is positioned intermediate the ends of the rod of Fig. 1.

The fishing rod is indicated by the numeral 6 and has the usual reel 7. An intermediate guide 8 is provided having the usual perforation or hole 9 for the line 10 and cut away at 11 to receive a cord 12 that is wrapped through the opening and around the rod to secure the guide firmly to the rod. The ends of the guide are tapered as shown at 13 and 14 to avoid fouling of the line in case it becomes wrapped around the rod, since any loops formed therein will slide smoothly over the guide.

A line guide 15 of elongated form is secured to the end of the rod in any suitable manner as by press fit with some knurling of the rod end or by cementing to the rod. The guide 15 has a socket 16 that is slightly tapered, for attachment to the rod and a line receiving aperture 17 in its forward end through which the line may slide freely.

The line guide 15 is smoothly tapering forwardly and rearwardly from its mid portion to reduce danger of fouling of the line and has raised sloping walls 18 that form an elongated recess and from which the line may slide readily in case it becomes wrapped around the tip through whipping action or otherwise. Also a drain hole 19 is provided in the bottom of the tip so that water and sand from the line can drain away readily instead of lodging in the pocket at the rear of the hole 17. The tip may be made of steel or hard metal alloy by drilling a short bar of the metal to form the holes and to give it the desired contours.

Referring now to Fig. 4, I show a guide 21 that may suitably be made of softer material than hard steel, such as aluminum. Aluminum or other soft material will be cheaper and easier to manufacture, but will not effectively resist line wear. Therefore, I provide a hard metal bushing 22 that can be inserted into the outer end of the guide and held there by press fitting or by a rivet 23 at each side of the guide that extends through the body of the tip into a hole in the bushing, the rivets or pins being suitably of soft metal such as a solder, so that worn bushings can readily be replaced. Another advantage of using a bushing is that bushings of diameters to suit various sizes of line can be substituted for one another.

The guide of Fig. 4 can also be applied to the rod by pressing it thereon or cementing, but I here show it as longitudinally slitted at 24 to enable it to be held in gripping engagement with the rod when a cord is wrapped around this socketed split portion, in the helical groove 25. This slitting or splitting of the guide will be desirable where the tips are to be used on rods of bamboo or glass fiber. The line so wrapped, as well as the line 12, will be coated with varnish or other coated material after wrapping. It will be apparent that the socket 16 of Figs. 2 and 3 could likewise be split and wrapped on the rod.

I claim as my invention:

A line guide for fishing rod tips comprising an elongated body smoothly tapering forwardly and rearwardly from its mid portion to its opposite ends, said body having a socket in its rear end to receive the forward end of a fishing rod, and having an elongated recess in the side of the body extending forwardly from the vicinity of said socket and communicating with a line receiving aperture passing through the forward end of the body.

ANDREW RITTER.

REFERENCES CITED

The following references are of record in the file of this patent:

UNITED STATES PATENTS

| Number | Name | Date |
| --- | --- | --- |
| 58,833 | Isaacs | Oct. 16, 1866 |
| 364,350 | Huth | June 7, 1887 |
| 670,961 | Lenharth | Apr. 2, 1901 |
| 868,563 | Holzman | Oct. 15, 1907 |
| 1,149,131 | Haberl et al. | Aug. 3, 1915 |
| 1,984,349 | Gurrieri et al. | Dec. 11, 1934 |
| 2,296,174 | Meisler | Sept. 15, 1942 |